(12) United States Patent
Choudhury et al.

(10) Patent No.: US 12,086,052 B2
(45) Date of Patent: Sep. 10, 2024

(54) SYSTEMS AND METHODS FOR A CONTINUOUS INTEGRATION / CONTINUOUS DEPLOYMENT MODEL

(71) Applicant: FMR LLC, Boston, MA (US)

(72) Inventors: Anila Kumar Choudhury, Cary, NC (US); Christopher Michael Allardice, North Providence, RI (US); Charlet Celina, Chennai (IN); James Brandon Gilbert Smith, Halifax (CA); Karl Hugo Ulrich, Raleigh, NC (US)

(73) Assignee: FMR LLC, Boston, MA (US)

( * ) Notice: Subject to any disclaimer, the term of this patent is extended or adjusted under 35 U.S.C. 154(b) by 107 days.

(21) Appl. No.: 17/862,311

(22) Filed: Jul. 11, 2022

(65) Prior Publication Data

US 2024/0012739 A1    Jan. 11, 2024

(51) Int. Cl.
*G06F 11/36* (2006.01)
*G06F 8/70* (2018.01)

(52) U.S. Cl.
CPC .......... *G06F 11/3664* (2013.01); *G06F 8/70* (2013.01); *G06F 11/3612* (2013.01)

(58) Field of Classification Search
CPC ..... G06F 11/1433; G06F 8/65; G06F 2201/84
USPC .................................................. 717/120–178
See application file for complete search history.

(56) References Cited

U.S. PATENT DOCUMENTS

| | | | |
|---|---|---|---|
| 10,817,530 B2* | 10/2020 | Siebel | G06F 16/283 |
| 10,997,532 B2* | 5/2021 | Govindugari | G06F 16/2219 |
| 11,194,566 B1* | 12/2021 | Gabrielson | G06F 8/65 |
| 11,561,842 B2* | 1/2023 | Murthy | G06F 11/3452 |
| 2018/0018602 A1* | 1/2018 | DiMaggio | G16H 10/60 |
| 2018/0302303 A1* | 10/2018 | Skovron | G06F 11/34 |
| 2020/0234217 A1* | 7/2020 | Arora | G06Q 10/06393 |
| 2021/0142159 A1 | 5/2021 | Gupta et al. | |
| 2021/0234930 A1 | 7/2021 | Dinh et al. | |
| 2021/0342251 A1* | 11/2021 | Gnaneswaran | G06N 20/20 |

OTHER PUBLICATIONS

Selig, Gad J. "IT governance—an integrated framework and roadmap: How to plan, deploy and sustain for competitive advantage." 2018 Portland International Conference on Management of Engineering and Technology (PICMET). IEEE, 2018.pp. 1-15. (Year: 2018).*

(Continued)

*Primary Examiner* — Satish Rampuria
(74) *Attorney, Agent, or Firm* — Cesari & McKenna, LLP

(57) ABSTRACT

Systems and methods are described herein for generating compliance indicators on a user interface corresponding to maturity levels of a continuous integration/continuous deployment system. A server captures compliance data corresponding to development status associated with a software application comprising newly-added source code. The server determines whether a plurality of maturity levels of a continuous integration system are completed for the software application based upon the captured compliance data. The server generates a plurality of compliance indicators, each of the compliance indicators corresponding to one of the maturity levels that is completed. The server generates for display the generated compliance indicators on a user interface of a user device communicatively coupled to the server.

16 Claims, 12 Drawing Sheets

(56) References Cited

OTHER PUBLICATIONS

Zhao, Yangyang, et al. "The impact of continuous integration on other software development practices: a large-scale empirical study." 2017 32nd IEEE/ACM International Conference on Automated Software Engineering (ASE). IEEE, 2017.pp.60-71. (Year: 2017).*

Lübke, Daniel, et al. "Interface evolution patterns: Balancing compatibility and extensibility across service life cycles." Proceedings of the 24th European Conference on Pattern Languages of Programs. 2019.pp. 1-24. (Year: 2019).*

Brown, Alan W., Scott Ambler, and Walker Royce. "Agility at scale: economic governance, measured improvement, and disciplined delivery." 2013 35th International Conference on Software Engineering (ICSE). IEEE, 2013.pp. 873-881 (Year: 2013).*

Fitzgerald, Brian, and Klaas-Jan Stol. "Continuous software engineering and beyond: trends and challenges." Proceedings of the 1st International Workshop on rapid continuous software engineering. 2014.pp.1-9 (Year: 2014).*

Kinsman, Timothy, et al. "How do software developers use github actions to automate their workflows?." 2021 IEEE/ACM 18th International Conference on Mining Software Repositories (MSR). IEEE, 2021.pp.420-431 (Year: 2021).*

* cited by examiner

600

Determine whether one or more maturity levels of a continuous deployment system are completed based on a first data file and a second data file

602

Generate one or more compliance indicators, each of the compliance indicators corresponding to one of the maturity levels that is completed

604

Generate for display the generated one or more of the compliance indicators on a user interface

Onboard an Application

Application ID *

Git Stash Repo *

CI Pipeline Job

Artifactory Link

SonarQube Project ID

☐ Same as CI Pipeline Job

Regression/Integration Job

☐ Same as CI Pipeline Job

Functional Automation Job

SYSTEMS AND METHODS FOR A CONTINUOUS INTEGRATION / CONTINUOUS DEPLOYMENT MODEL

TECHNICAL FIELD

The present invention relates generally to systems and methods for continuous integration/continuous deployment of software code, including systems and methods for generating compliance indicators for a continuous integration/continuous deployment model.

BACKGROUND

Many organizations rely on a continuous integration/continuous deployment (CI/CD) model to deliver software applications to customers. CI/CD allows for the automation of enforcement in building, testing, and deployment of software applications. However, current CI/CD solutions have many components within the CI/CD journey. Developers may have a hard time understanding where their software code stands in terms of implementation of CI/CD components, and what they need to implement next in the CI/CD journey. Therefore, there is a need for an automated tool that allows developers to understand the status of each CI/CD component in a consolidated and data-driven manner in order to see a holistic as well as detailed view of their application's CI/CD status.

SUMMARY

Accordingly, an object of the invention is to provide systems and methods for determining completion of maturity levels of a continuous integration system. It is an object of the invention to provide systems and methods for generating compliance indicators on a user interface corresponding to maturity levels of a continuous integration system. It is an object of the invention to provide systems and methods for determining completion of maturity levels of a continuous deployment system. It is an object of the invention to provide systems and methods for generating compliance indicators on a user interface corresponding to maturity levels of a continuous deployment system.

The invention, in one aspect, features a computerized method of generating compliance indicators on a user interface corresponding to a plurality of maturity levels of a continuous integration system. A server computing device captures compliance data corresponding to development status associated with a software application, the software application comprising newly-added source code and the compliance data captured using a plurality of individual collector modules each interfacing with a different data source. The server computing device determines whether one or more of a plurality of maturity levels of a continuous integration system are completed for the software application based upon the captured compliance data, where each of the plurality of maturity levels of the continuous integration system corresponds to one or more developer actions to be completed. The server computing device generates one or more of a plurality of compliance indicators, each of the plurality of compliance indicators corresponding to one of the plurality of maturity levels that is completed. The server computing device generates for display the generated one or more of the plurality of compliance indicators on a user interface of a user device communicatively coupled to the server computing device.

The invention, in another aspect, features a system for generating compliance indicators on a user interface corresponding to a plurality of maturity levels of a continuous integration system. The system comprises a server computing device communicatively coupled to a user device and a database over a network, the server computing device comprising a memory for storing computer-executable instructions and a processor that executes the computer-executable instructions. The server computing device captures compliance data corresponding to development status associated with a software application, the software application comprising newly-added source code and the compliance data captured using a plurality of individual collector modules each interfacing with a different data source. The server computing device determines whether one or more of a plurality of maturity levels of a continuous integration system are completed for the software application based upon the captured compliance data, where each of the plurality of maturity levels of the continuous integration system corresponds to one or more developer actions to be completed. The server computing device generates one or more of a plurality of compliance indicators, each of the plurality of compliance indicators corresponding to one of the plurality of maturity levels that is completed. The server computing device generates for display the generated one or more of the plurality of compliance indicators on a user interface of a user device communicatively coupled to the server computing device.

Any of the above aspects can include one or more of the following features. In some embodiments, the plurality of maturity levels comprises at least five maturity levels. In some embodiments, determining that a first level of the plurality of maturity levels is completed comprises determining whether a plurality of artifacts have been generated after one or more builds of the software application, and determining whether the plurality of artifacts have been transmitted to a repository. In some embodiments, determining that a second level of the plurality of maturity levels is completed comprises determining whether one of the one or more builds of the software application that includes the newly-added source code is triggered on a code commit, and calculating whether a unit test coverage corresponding to the newly-added source code is greater than or equal to 80%.

In some embodiments, determining that a third level of the plurality of maturity levels is completed comprises calculating whether a unit test coverage corresponding to overall source code of the software application is greater than or equal to 50%, and determining whether a quality gate status has passed. In some embodiments, determining that a fourth level of the plurality of maturity levels is completed comprises calculating whether the unit test coverage corresponding to the overall source code of the software application is greater than or equal to 70%, and determining whether a plurality of static security scans have been completed. In some embodiments, determining that a fifth level of the plurality of maturity levels is completed comprises calculating whether the unit test coverage corresponding to the overall source code of the software application is greater than or equal to 80%.

The invention, in another aspect, features a computerized method of generating compliance indicators on a user interface corresponding to a plurality of maturity levels of a continuous deployment system. A server computing device captures compliance data corresponding to deployment status associated with a software application, the software application comprising newly-added source code and the compliance data captured using a plurality of individual collector modules each interfacing with a different data source. The server computing device determines whether one or more of a plurality of maturity levels of a continuous deployment system are completed for the software application based upon the captured compliance data, where each of the plurality of maturity levels of the continuous deployment system corresponds to one or more developer actions to be completed. The server computing device generates one or more of a plurality of compliance indicators, each of the plurality of compliance indicators corresponding to one of the plurality of maturity levels that is completed. The server computing device generates for display the generated one or more of the plurality of compliance indicators on a user interface of a user device communicatively coupled to the server computing device.

The invention, in another aspect, features a system for generating compliance indicators on a user interface corresponding to a plurality of maturity levels of a continuous deployment system. The system comprises a server computing device communicatively coupled to a user device and a database over a network, the server computing device comprising a memory for storing computer-executable instructions and a processor that executes the computer-executable instructions. The server computing device captures compliance data corresponding to deployment status associated with a software application, the software application comprising newly-added source code and the compliance data captured using a plurality of individual collector modules each interfacing with a different data source. The server computing device determines whether one or more of a plurality of maturity levels of a continuous deployment system are completed for the software application based upon the captured compliance data, where each of the plurality of maturity levels of the continuous deployment system corresponds to one or more developer actions to be completed. The server computing device generates one or more of a plurality of compliance indicators, each of the plurality of compliance indicators corresponding to one of the plurality of maturity levels that is completed. The server computing device generates for display the generated one or more of the plurality of compliance indicators on a user interface of a user device communicatively coupled to the server computing device.

Any of the above aspects can include one or more of the following features. In some embodiments, determining that a first level of the plurality of maturity levels is completed comprises receiving a pre-check indicator from an artifact repository associated with the software application, and determining whether an artifact corresponding to the newly-added source code has been deployed to a managed environment. In some embodiments, determining that a second level of the plurality of maturity levels is completed comprises determining whether at least one of a plurality of automated smoke tests have been completed on a latest deployed version of the software application. In some embodiments, determining that a third level of the plurality of maturity levels is completed comprises determining whether at least one of a plurality of automated functional/regression tests have been completed on the latest deployed version of the software application.

In some embodiments, determining that a fourth level of the plurality of maturity levels is completed comprises determining whether a dynamic security scan has been completed on the latest deployed version of the software application, and determining whether a personally identifiable information (PII) data scan has been completed on the latest deployed version of the software application. In some embodiments, determining that a fifth level of the plurality of maturity levels is completed comprises determining whether chaos testing has been completed on the latest deployed version of the software application, determining whether performance testing has been completed on the latest deployed version of the software application, and determining whether accessibility testing has been completed on the latest deployed version of the software application.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6 is a flow diagram of a computer-implemented method for generating compliance indicators on a user interface corresponding to maturity levels of a continuous deployment system, according to embodiments of the technology described herein.

FIG. 9 is a diagram of an exemplary user interface for initiating onboarding of an application to capture and analyze application data in order to generate compliance indicators corresponding to CI/CD maturity levels of the application.

DETAILED DESCRIPTION

In some aspects, the systems and methods described herein can include one or more mechanisms or methods for determining completion of maturity levels of a continuous integration system. For example, the systems and methods described herein can include mechanisms or methods for generating compliance indicators on a user interface corresponding to maturity levels of a continuous integration system. The systems and methods described herein can include mechanisms or methods for determining completion of maturity levels of a continuous deployment system. The systems and methods described herein can include mechanisms or methods for generating compliance indicators on a user interface corresponding to maturity levels of a continuous deployment system.

Figure 1:
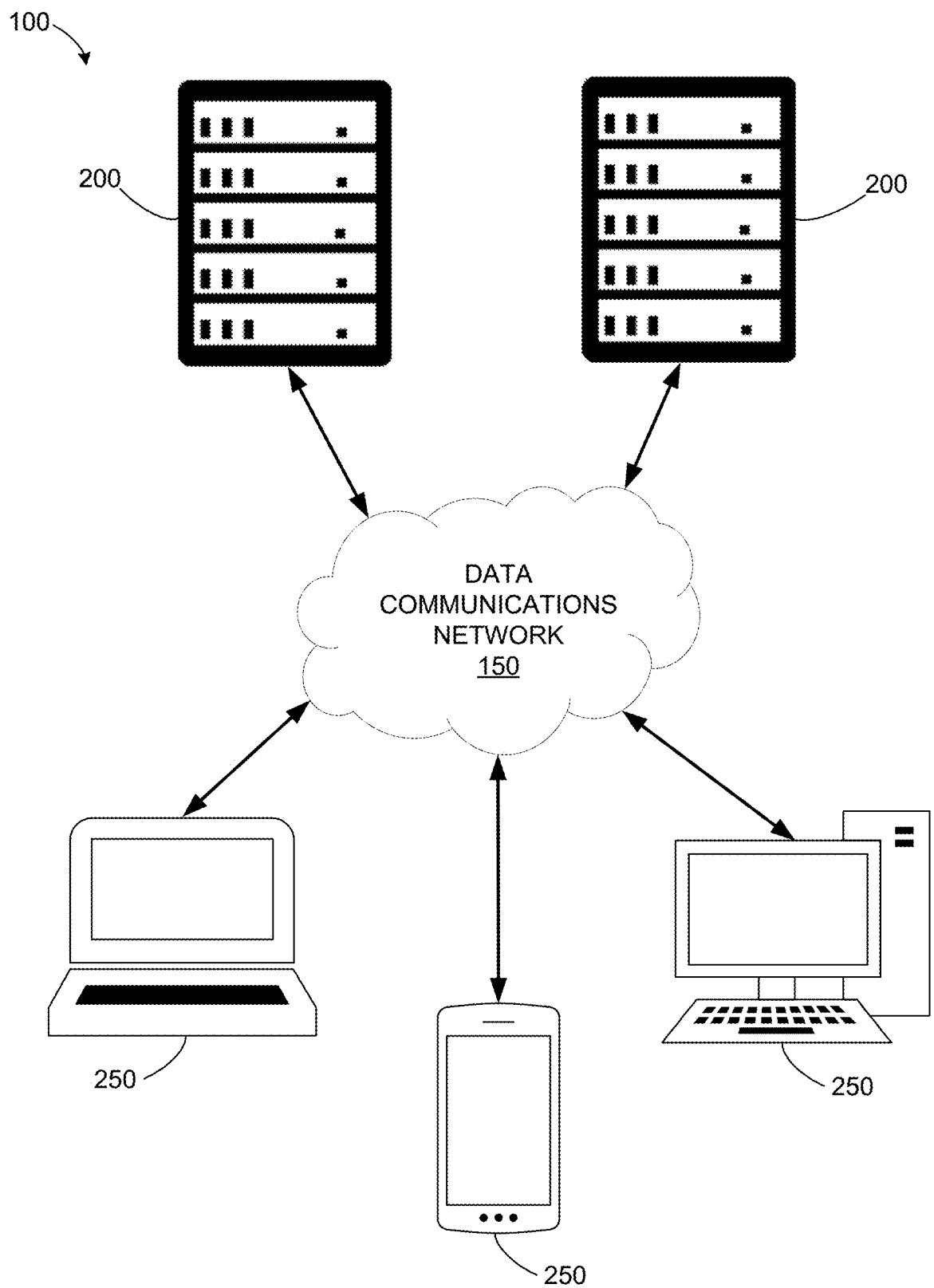
FIG. 1 is a block diagram of an exemplary data communications network, according to embodiments of the technology described herein.
Figure 2:
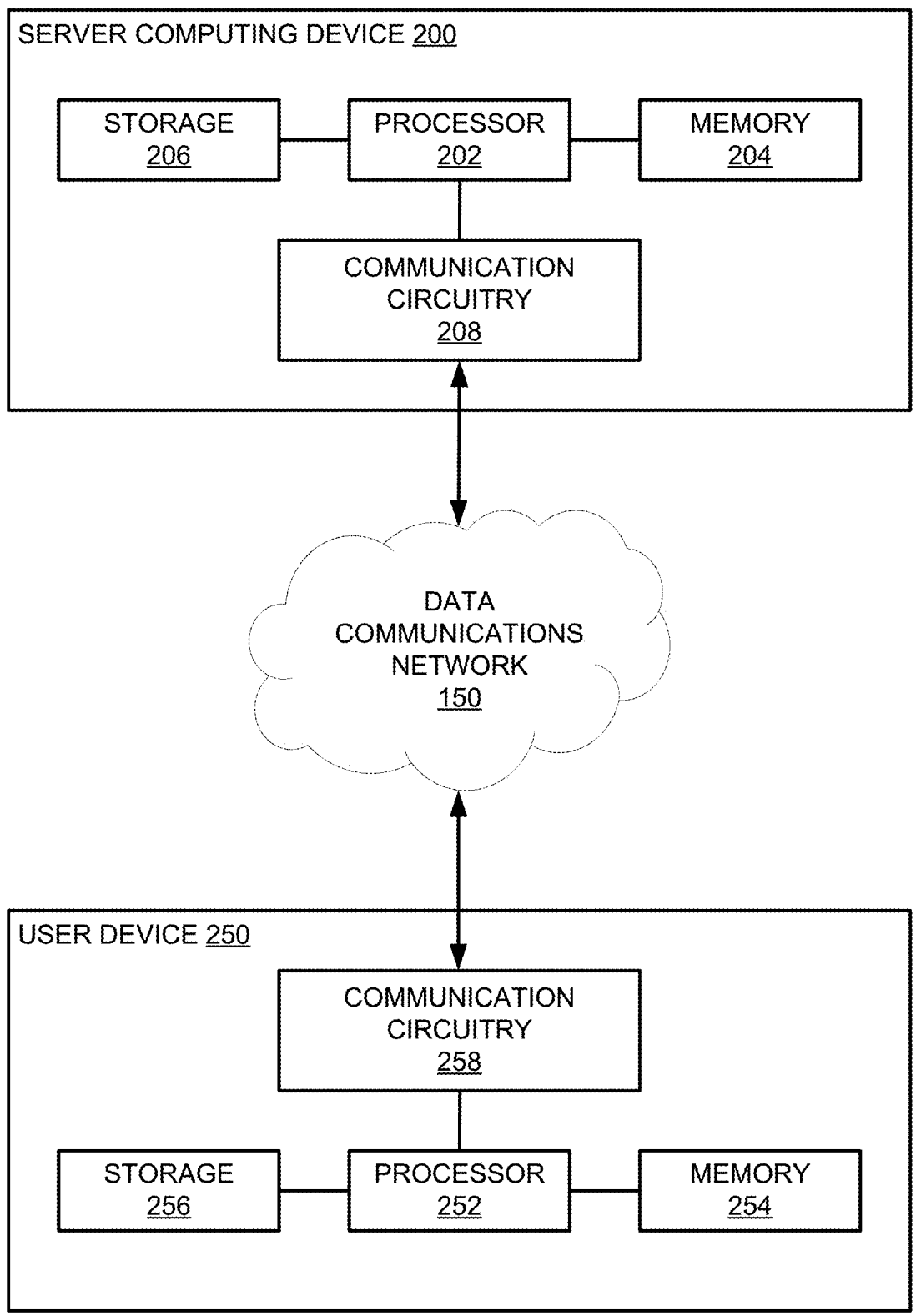
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
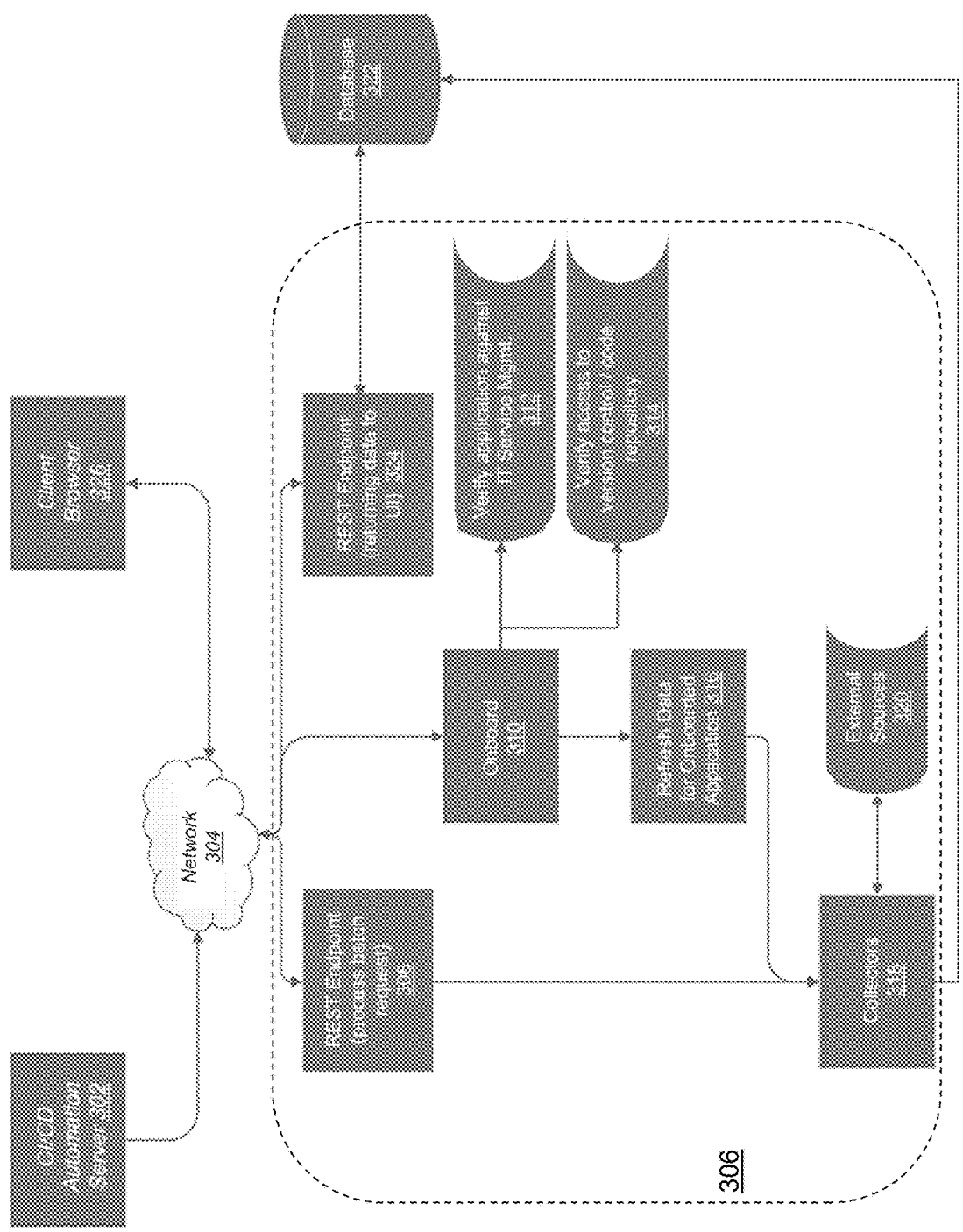
FIG. 3 is a workflow diagram of a computerized process for capturing and analyzing data for continuous integration/continuous deployment for an onboarded application.

FIG. 3 is a workflow diagram 300 for capturing and analyzing data for continuous integration/continuous deployment (CI/CD) for an onboarded application. As shown in FIG. 3, a CI/CD automation server computing device 302 that is executing a CI/CD automation platform (e.g., Jenkins™ available from the Jenkins Project at jenkins.io) establishes a connection via network 304 to server computing device 306. Server computing device 306 comprises one or more functions and/or collector computing modules that operate to capture and analyze data for CI/CD for an onboarded application, as identified by CI/CD automation server 302. REST Endpoint 308 receives the request (e.g. a batch request) from CI/CD automation server 302 and processes the batch request. For applications being onboarded (e.g., new applications or newly-added portions of code for an existing application), server computing device 306 executes an onboard function 310 that verifies the application against an IT service management platform directory 312 (such as ServiceNow™ available from ServiceNow, Inc. of Santa Clara, California) and verifies access to version control hosting (such as Artifactory™ available from Jfrog Ltd. of Sunnyvale, California) and/or code collaboration and repositories that host the application (such as Bitbucket™ available from Atlassian, Inc. of Sydney, Australia). Server computing device 306 then executes a function to refresh CI/CD maturity data for the onboarded application(s) 316.

Figure 4A:
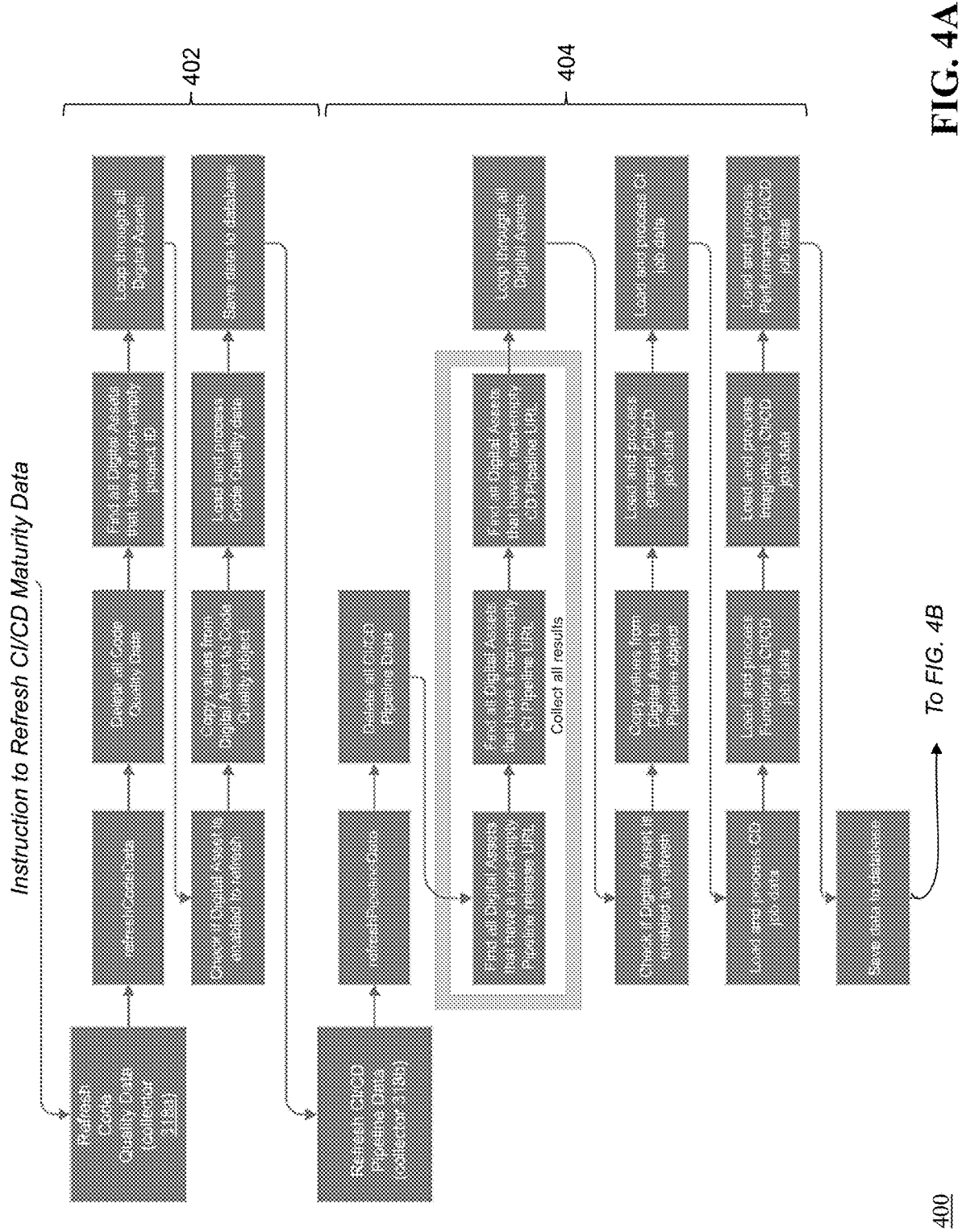
FIGS. 4A to 4D comprise a detailed workflow diagram of a computerized process for capturing and analyzing data for continuous integration/continuous deployment for an onboarded application using collector modules.

In some embodiments, server computing device 306 executes a plurality of collector modules 318 to refresh the CI/CD maturity data, including interfacing with one or more external data sources 320. FIGS. 4A to 4D comprise a detailed workflow diagram 400 for capturing and analyzing data for continuous integration/continuous deployment for an onboarded application using the collector modules of server computing device 306. As shown in FIG. 4A, server computing device 306 issues an instruction (via 316 of FIG. 3) to the collector modules to refresh CI/CD maturity data for the onboarded application. In some embodiments, collector module 318a refreshes Code Quality data (block 402) for the onboarded application by retrieving data from a code quality analysis platform. An exemplary code quality analysis platform is SonarQube™ available from Sonarsource of Geneva, Switzerland. The steps for refreshing the code quality data and storing the refreshed data in database (e.g., 322 of FIG. 3) are shown in block 402.

After the refreshed code quality data is stored in database, collector module 318b refreshes CI/CD pipeline data (block 404) for the onboarded application by retrieving data from CI/CD automation server 302. An exemplary CI/CD pipeline platform is Jenkins™ available from the Jenkins Project at jenkins.io. The steps for refreshing the code quality data and storing the refreshed data in database 322 are shown in block 404.

Figure 4B:
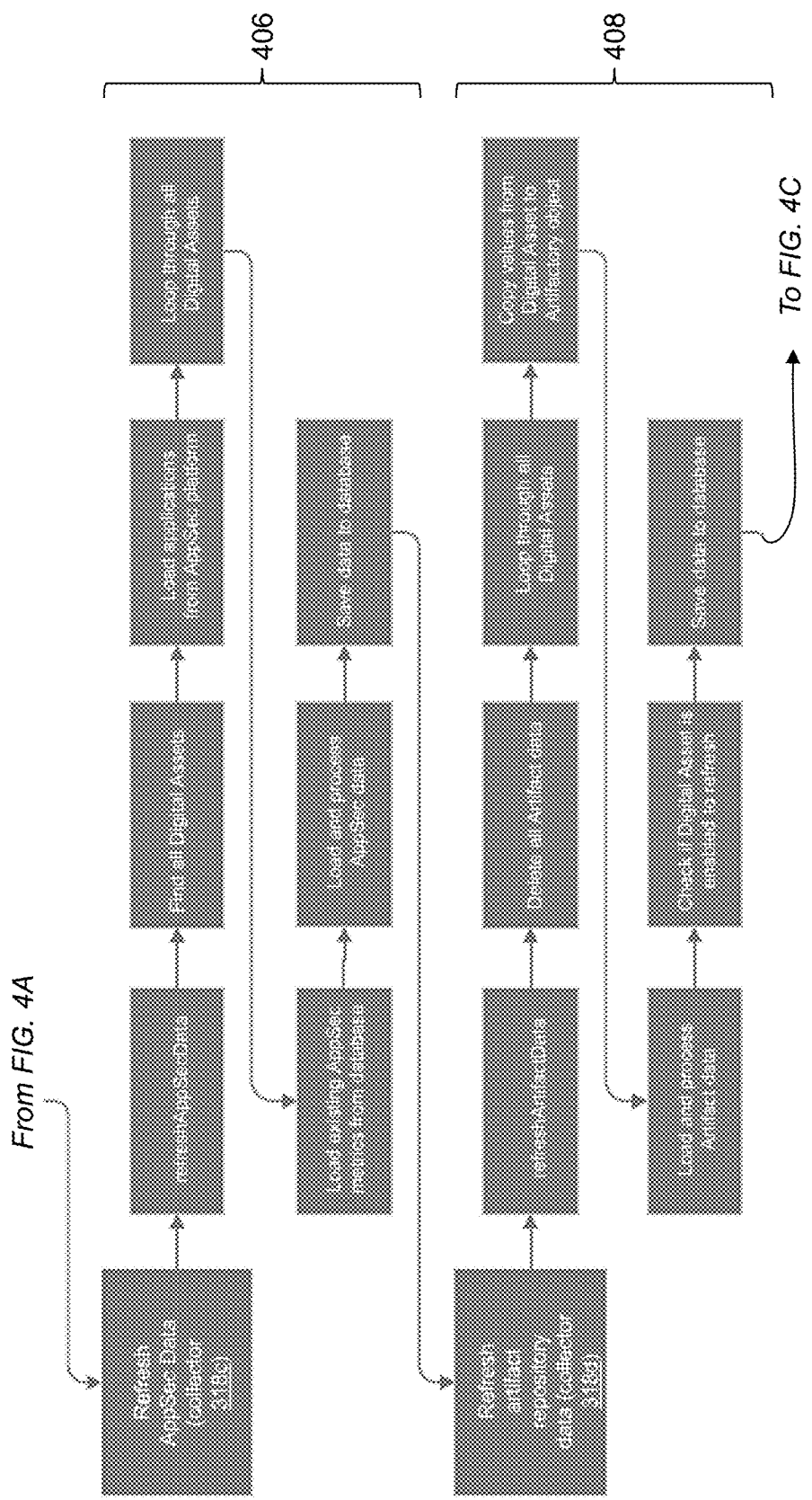

Turning to FIG. 4B, collector module 318c refreshes application security (AppSec) data (block 406) for the onboarded application by retrieving data from an application security platform (such as Veracode™ available from Veracode of Burlington, Massachusetts). The steps for refreshing the application security data and storing the refreshed data in database 322 are shown in block 406. After refreshing the application security data, collector module 318d refreshes artifact repository data (block 408) for the onboarded application by retrieving data from an artifact management platform (such as Artifactory™ available from Jfrog Ltd. of Sunnyvale, California). The steps for refreshing the artifact repository data and storing the refreshed data in database 322 are shown in block 408.

Figure 4C:
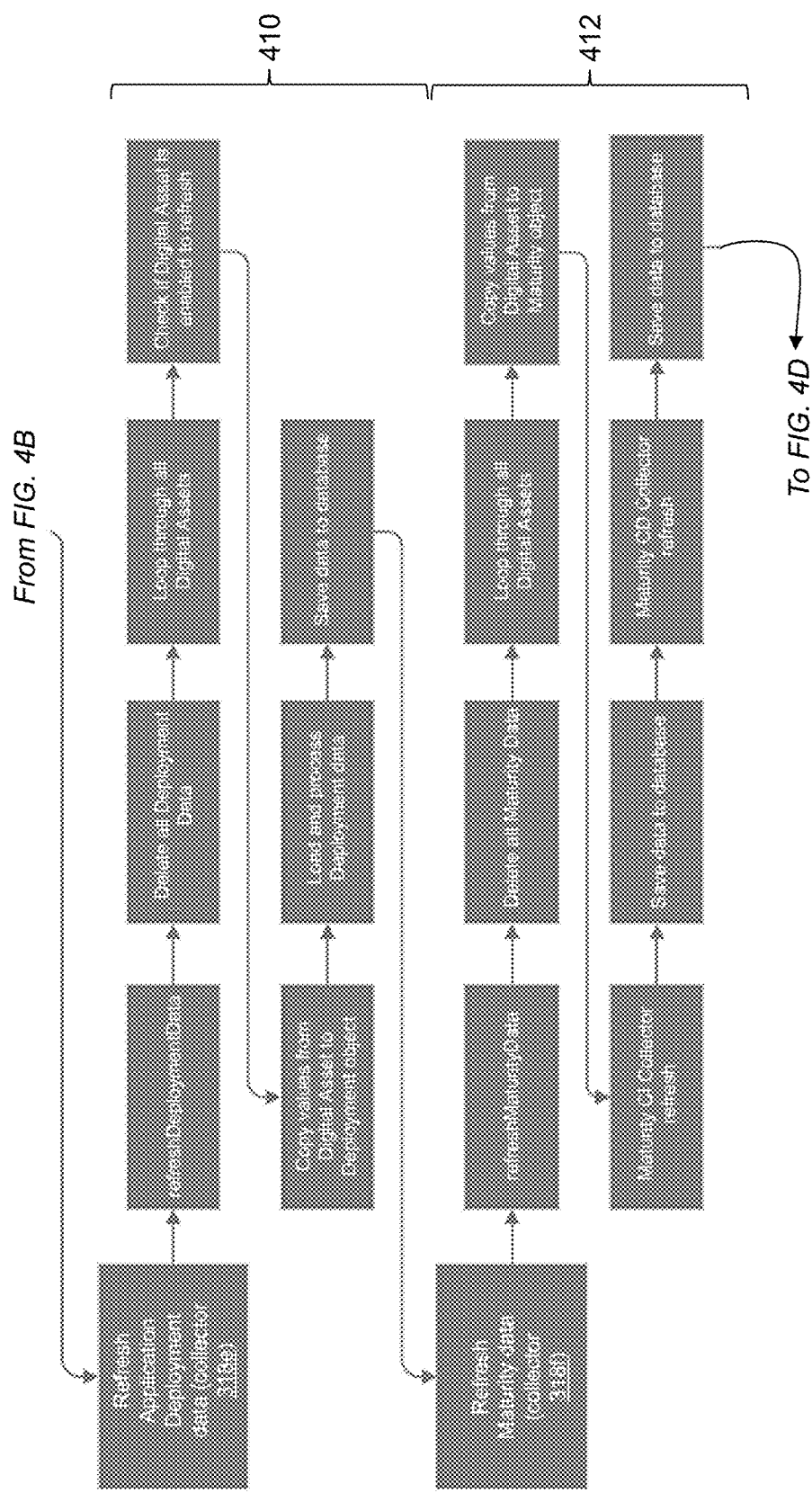

Turning to FIG. 4C, collector module 318e refreshes application deployment data (block 410) for the onboarded application by retrieving data from an application deployment automation platform (such as UrbanCode Deploy™ available from IBM Corp. of Armonk, New York). The steps for refreshing the application deployment data and storing the refreshed data in database 322 are shown in block 410. After refreshing the application deployment data, collector module 318f refreshes maturity data (block 412) for the onboarded application and stores the refreshed data in database 322—described in more detail below with respect to FIGS. 5 and 6.

Figure 4D:
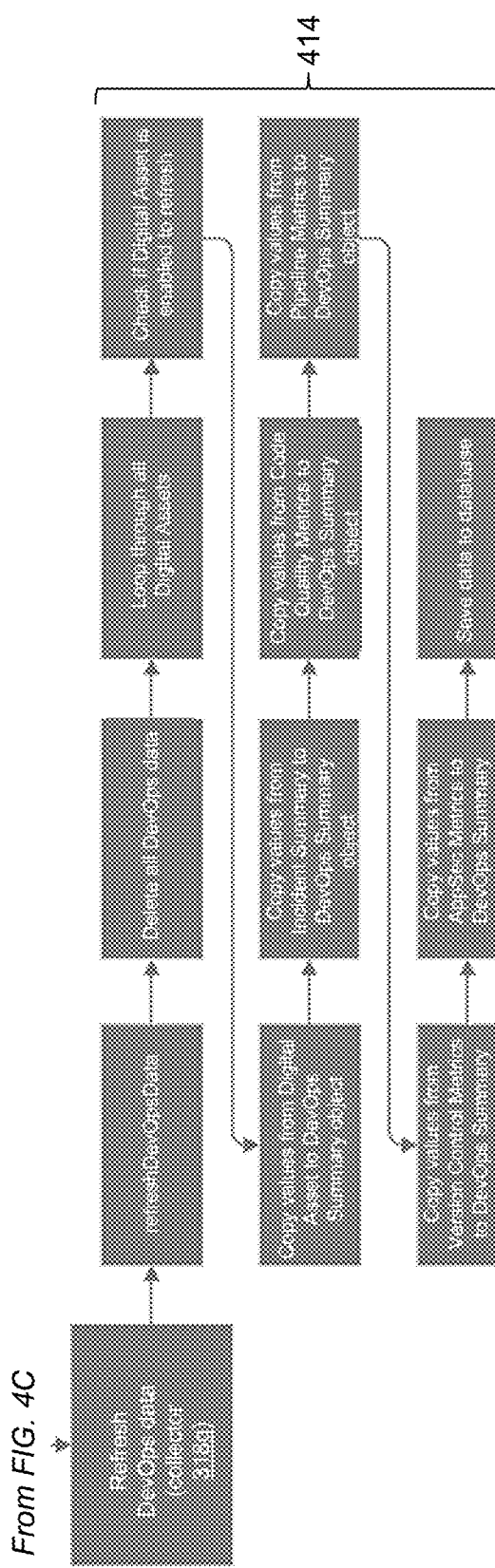

Turning to FIG. 4D, collector module 318g refreshes DevOps data (block 414) for the onboarded application by retrieving data from one or more of the other collector modules 318a-318f and storing the data in a DevOps summary object in database 322. The steps for refreshing the DevOps data and storing the refreshed data in database 322 are shown in block 414.

Turning back to FIG. 3, after the collector modules 318 have completed the data capture and analysis process described above and stored the relevant data elements in database 322, REST endpoint 324 can retrieve one or more of the data elements from database 322 and generate a user interface based upon the retrieved data for display to an end user via client browser 326. Further details on the generation and display of compliance indicators is provided below.

Figure 5:
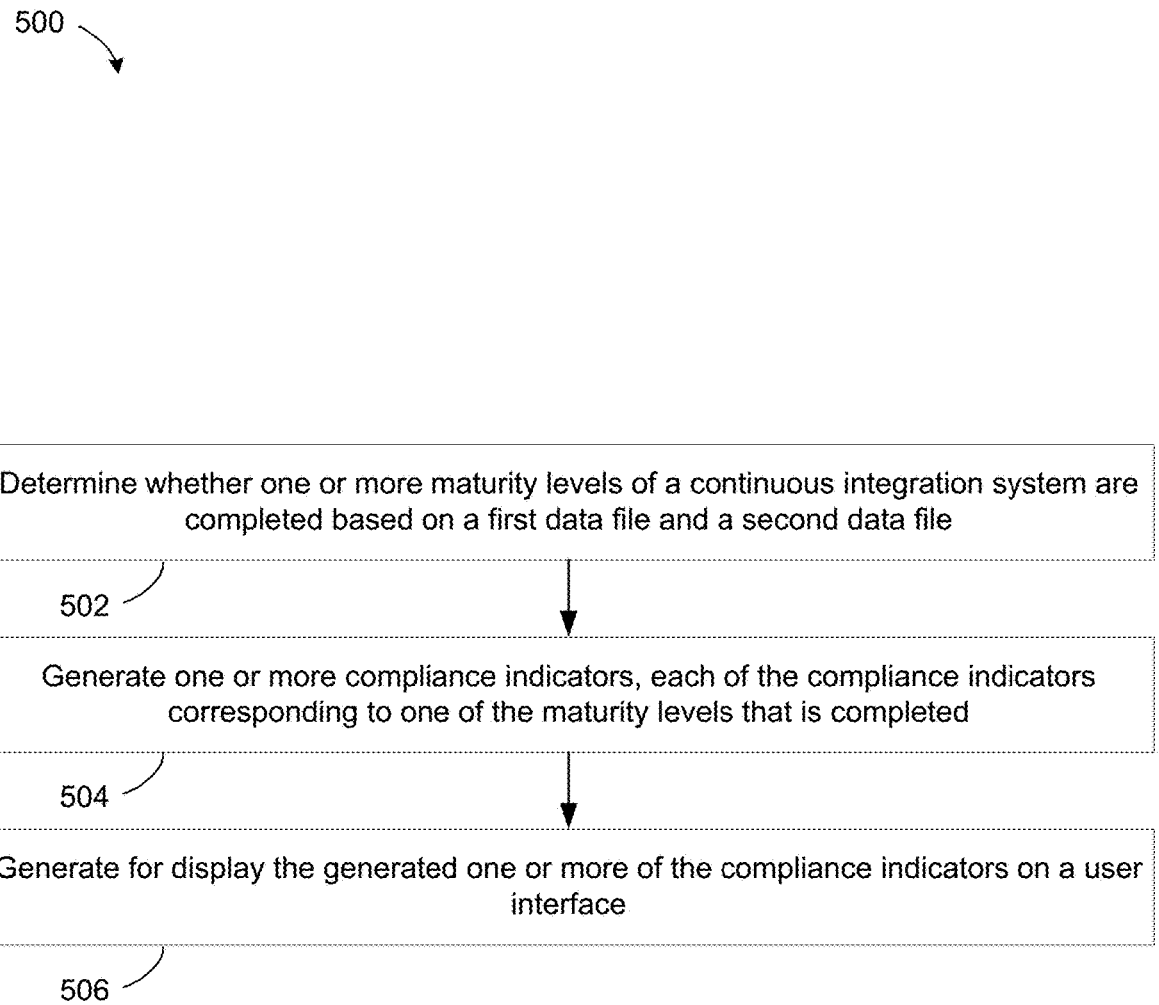
FIG. 5 is a flow diagram of a computer-implemented method for generating compliance indicators on a user interface corresponding to maturity levels of a continuous integration system, according to embodiments of the technology described herein.

Referring to FIG. 5, a process 500 for generating compliance indicators on a user interface corresponding to maturity levels of a continuous integration system is illustrated. Process 500 begins by capturing compliance data corresponding to deployment status associated with a software application, the software application comprising newly-added source code and the compliance data captured using a plurality of individual collector modules each interfacing with a different data source at step 502 (detailed above with respect to FIGS. 4A-4D). At step 504, the server computing device determines whether one or more of a plurality of maturity levels of a continuous integration system are completed for the software application based upon the captured compliance data, where each of the plurality of maturity levels of the continuous integration system corresponds to one or more developer actions to be completed.

Process 500 continues by generating one or more compliance indicators, each of the compliance indicators corresponding to one of the maturity levels that is completed, at step 506. Process 500 finishes by generating for display the generated one or more compliance indicators on a user interface at step 508. In some embodiments, the maturity levels include at least five maturity levels.

For example, in some embodiments, step 504 of process 500 comprises determining that a first level of the maturity levels is completed by determining whether a plurality of artifacts have been generated after one or more builds of the software application and determining whether the artifacts have been transmitted to a repository. In some embodiments, step 504 of process 500 comprises determining that a second level of the maturity levels is completed by determining whether one of the one or more builds of the software application that includes the newly-added source code is triggered on a code commit and calculating whether a unit test coverage corresponding to the newly-added source code is greater than or equal to 80%. In some embodiments, step 504 of process 500 comprises determining that a third level of the maturity levels is completed by calculating whether a unit test coverage corresponding to overall source code of the software application is greater than or equal to 50% and determining whether a quality gate status has passed. In some embodiments, step 504 of process 500 comprises determining that a fourth level of the maturity levels is completed by calculating whether the unit test coverage corresponding to the overall source code of the software application is greater than or equal to 70% and determining whether static security scans have been completed. In some embodiments, step 504 of process 500 comprises determining that a fifth level of the maturity levels is completed by calculating whether the unit test coverage corresponding to the overall source code of the software application is greater than or equal to 80%.

In some aspects, process 500 can be implemented on a system for generating compliance indicators on a user interface corresponding to maturity levels of a continuous integration system. The system can include a server computing device 200 communicatively coupled to a user device 250 and a database over a network 150. The server computing device 200 can be configured to capture compliance data corresponding to deployment status associated with a software application, the software application comprising newly-added source code and the compliance data captured using a plurality of individual collector modules each interfacing with a different data source (detailed above with respect to FIGS. 4A-4D). The server computing device 200 can be configured to determine whether one or more of a plurality of maturity levels of a continuous integration system are completed for the software application based upon the captured compliance data, where each of the plurality of maturity levels of the continuous integration system corresponds to one or more developer actions to be completed. The server computing device 200 can also be configured to generate one or more compliance indicators, each of the compliance indicators corresponding to one of the maturity levels that is completed. The server computing device 200 can also be configured to generate for display the generated one or more compliance indicators on a user interface. In some embodiments, the maturity levels include at least five maturity levels.

For example, in some embodiments, the server computing device 200 can be further configured to determine that a first level of the maturity levels is completed by determining whether a plurality of artifacts have been generated after one or more builds of the software application and determining whether the artifacts have been transmitted to a repository. In some embodiments, the server computing device 200 can be further configured to determine that a second level of the maturity levels is completed by determining that a second level of the maturity levels is completed by determining whether one of the one or more builds of the software application that includes the newly-added source code is triggered on a code commit and calculating whether a unit test coverage corresponding to the newly-added source code is greater than or equal to 80%.

In some embodiments, the server computing device 200 can be further configured to determine that a third level of the maturity levels is completed by calculating whether a unit test coverage corresponding to overall source code of the software application is greater than or equal to 50% and determining whether a quality gate status has passed. In some embodiments, the server computing device 200 can be further configured to determine that a fourth level of the maturity levels is completed by calculating whether the unit test coverage corresponding to the overall source code of the software application is greater than or equal to 70% and determining whether static security scans have been completed. In some embodiments, the server computing device 200 can be further configured to determine that a fifth level of the maturity levels is completed by calculating whether the unit test coverage corresponding to the overall source code of the software application is greater than or equal to 80%.

Referring to FIG. 6, a process 600 for generating compliance indicators on a user interface corresponding to maturity levels of a continuous deployment system is illustrated. Process 600 begins by capturing compliance data corresponding to deployment status associated with a software application, the software application comprising newly-added source code and the compliance data captured using a plurality of individual collector modules each interfacing with a different data source at step 602 (detailed above with respect to FIGS. 4A-4D). At step 604, the server computing device determines whether one or more of a plurality of maturity levels of a continuous deployment system are completed for the software application based upon the captured compliance data, where each of the plurality of maturity levels of the continuous deployment system corresponds to one or more developer actions to be completed.

Process 600 continues by generating one or more compliance indicators, each of the compliance indicators corresponding to one of the maturity levels that is completed, at step 606. Process 600 finishes by generating for display the generated one or more compliance indicators on a user interface at step 608. In some embodiments, the maturity levels include at least five maturity levels.

In some embodiments, step 604 of process 600 comprises determining that a first level of the maturity levels is completed by receiving a pre-check indicator from an artifact repository associated with the software application and determining whether an artifact corresponding to the newly-added source code has been deployed to a managed environment. In some embodiments, step 604 of process 600 comprises determining that a second level of the maturity levels is completed by determining whether at least one of a plurality of automated smoke tests have been completed on a latest deployed version of the software application. In some embodiments, step 604 of process 600 comprises determining that a third level of the maturity levels is completed by determining whether at least one of a plurality of automated functional/regression tests have been completed on the latest deployed version of the software application.

In some embodiments, step 604 of process 600 comprises determining that a fourth level of the maturity levels is completed by determining whether a dynamic security scan has been completed on the latest deployed version of the software application and determining whether a personally identifiable information (PII) data scan has been completed on the latest deployed version of the software application. In some embodiments, step 604 of process 600 comprises determining that a fifth level of the maturity levels is completed by determining whether chaos testing has been completed on the latest deployed version of the software application, determining whether performance testing has been completed on the latest deployed version of the software application, and determining whether accessibility testing has been completed on the latest deployed version of the software application.

In some aspects, process 600 can be implemented on a system for generating compliance indicators on a user interface corresponding to maturity levels of a continuous deployment system. The system can include a server computing device 200 communicatively coupled to a user device 250 and a database over a network 150. The server computing device 200 can be configured to capture compliance data corresponding to deployment status associated with a software application, the software application comprising newly-added source code and the compliance data captured using a plurality of individual collector modules each interfacing with a different data source (detailed above with respect to FIGS. 4A-4D). The server computing device can be configured to determine whether one or more of a plurality of maturity levels of a continuous deployment system are completed for the software application based upon the captured compliance data, where each of the plurality of maturity levels of the continuous deployment system corresponds to one or more developer actions to be completed.

The server computing device can be configured to generate one or more compliance indicators, each of the compliance indicators corresponding to one of the maturity levels that is completed. The server computing device can be configured to generate for display the generated one or more compliance indicators on a user interface. In some embodiments, the maturity levels include at least five maturity levels.

In some embodiments, the server computing device 200 can be further configured to determine that a first level of the maturity levels is completed by receiving a pre-check indicator from an artifact repository associated with the software application and determining whether an artifact corresponding to the newly-added source code has been deployed to a managed environment. In some embodiments, the server computing device 200 can be further configured to determine that a second level of the maturity levels is completed by determining whether at least one of a plurality of automated smoke tests have been completed on a latest deployed version of the software application. In some embodiments, the server computing device 200 can be further configured to determine that a third level of the maturity levels is completed by determining whether at least one of a plurality of automated functional/regression tests have been completed on the latest deployed version of the software application.

In some embodiments, the server computing device 200 can be further configured to determine that a fourth level of the maturity levels is completed by determining whether a dynamic security scan has been completed on the latest deployed version of the software application and determining whether a personally identifiable information (PII) data scan has been completed on the latest deployed version of the software application. In some embodiments, the server computing device 200 can be further configured to determine that a fifth level of the maturity levels is completed by determining whether chaos testing has been completed on latest deployed version of the software application, determining whether performance testing has been completed on the latest deployed version of the software application, and determining whether accessibility testing has been completed on the latest deployed version of the software application.

Figure 7:
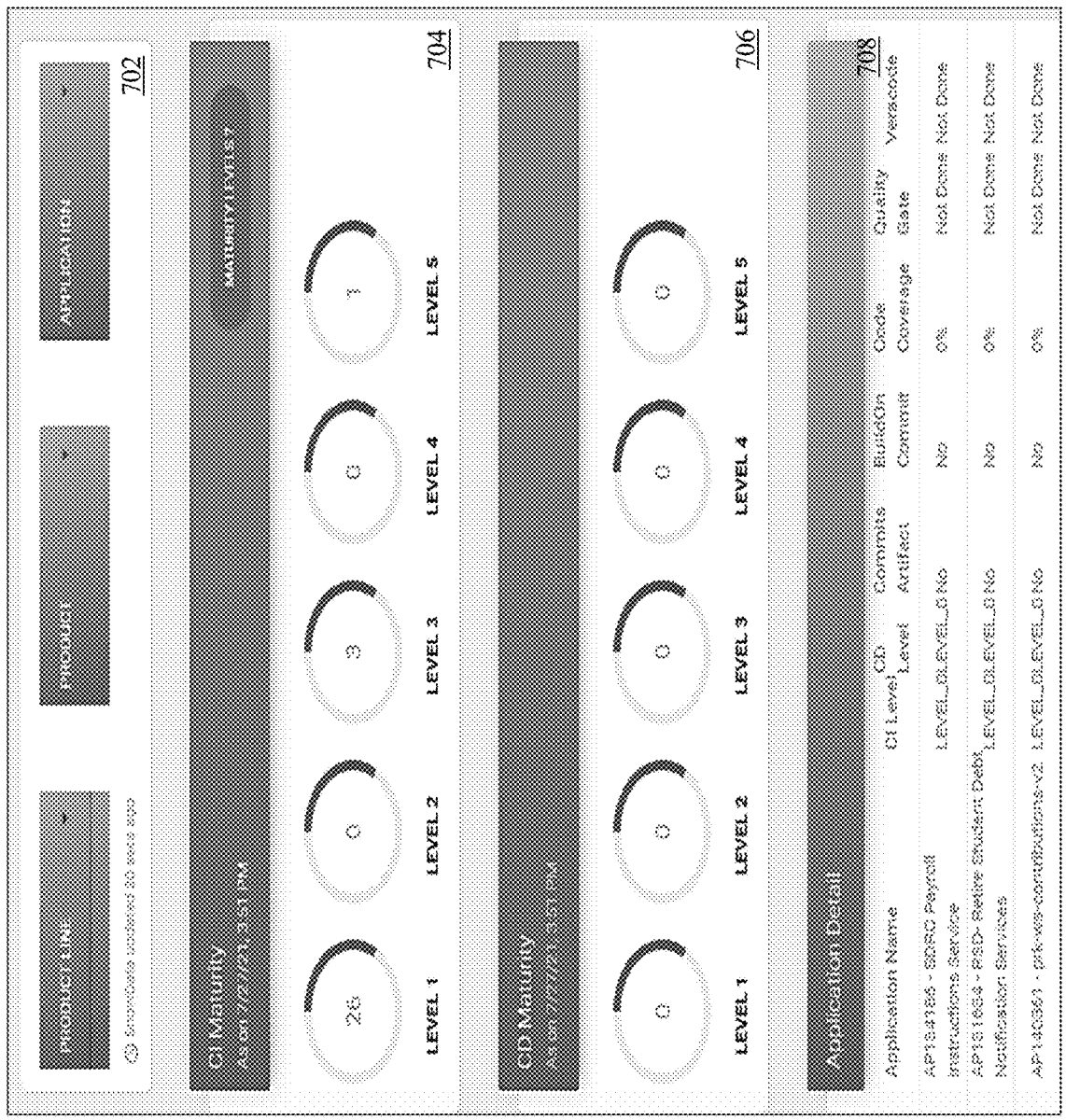
FIG. 7 is a diagram of an exemplary user interface for a dashboard for displaying compliance indicators corresponding to CI/CD maturity levels.

FIG. 7 is a diagram of an exemplary user interface for a dashboard 700 for displaying compliance indicators corresponding to CI/CD maturity levels. As shown in FIG. 7, dashboard 700 includes a plurality of selection menus 702 that enable a user to select a product line, product, and/or application to review CI/CD maturity data. Once selected, system can populate the CI Maturity indicators 704 and CD Maturity indicators 706 based upon the data aggregation and analysis as described above. In addition, dashboard 700 displays CI/CD maturity details for one or more applications in the detail section 708.

Figure 8:
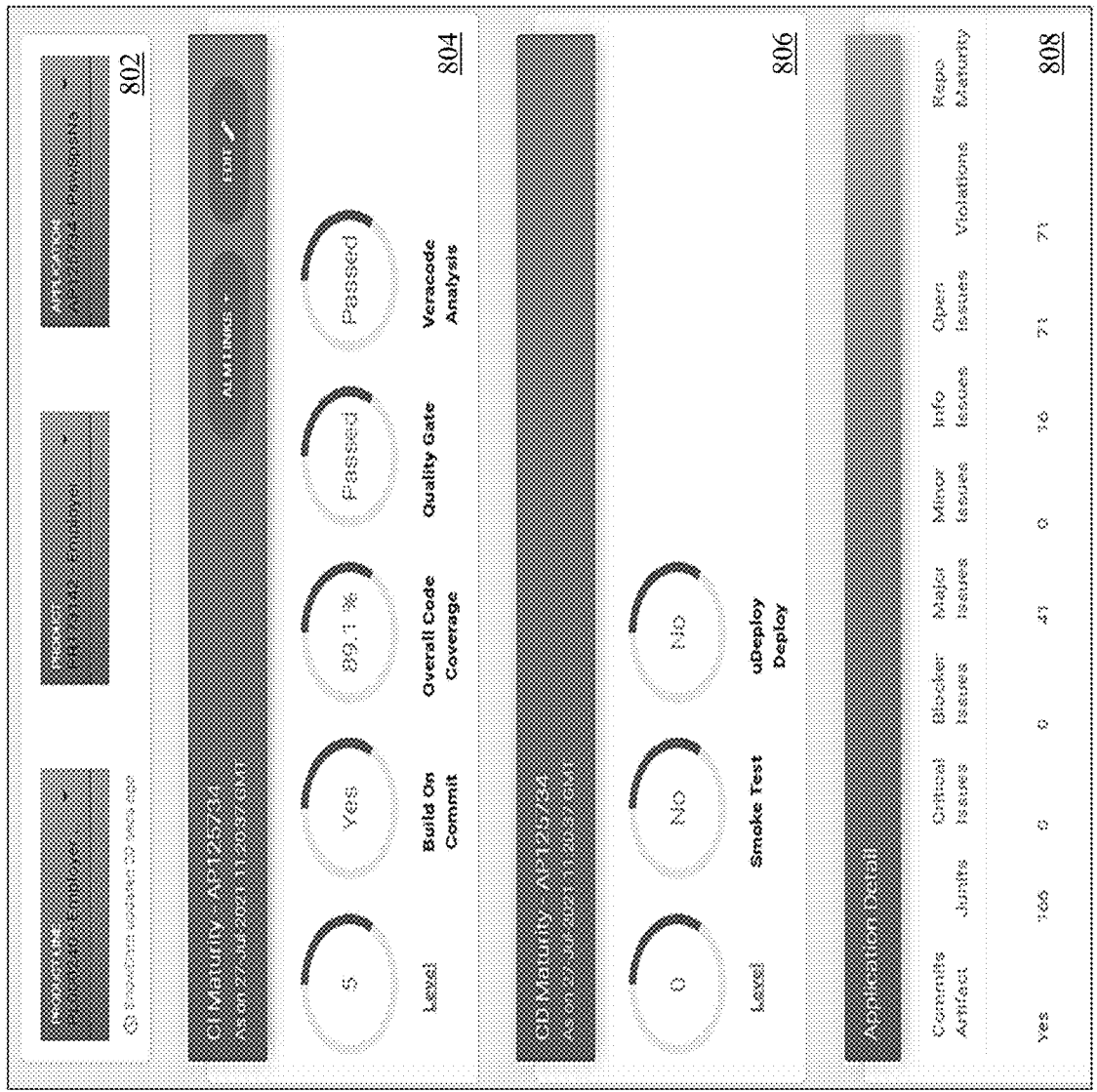
FIG. 8 is a diagram of an exemplary user interface for displaying compliance indicators corresponding to CI/CD maturity levels of an application.

FIG. 8 is a diagram of an exemplary user interface 800 for displaying compliance indicators corresponding to CI/CD maturity levels of an application. As shown in FIG. 8, user interface 800 includes a plurality of selection menus 802 that have a specific application selected for review. Upon selection of the application, system populates the CI Maturity indicators 804 and CD Maturity indicators 806 based upon the data aggregation and analysis as described above. In addition, user interface 800 displays CI/CD details and statistics for the selected application in the detail section 808.

FIG. 9 is a diagram of an exemplary user interface 900 for initiating onboarding of an application to capture and analyze application data in order to generate compliance indicators corresponding to CI/CD maturity levels of the application. As described above, an end user can initiate onboarding of an application in order to analyze CI/CD maturity levels using, e.g., client browser 326. As shown in FIG. 9, user interface 900 comprises a plurality of data input fields that allow the end user to provide specific attributes of an application (e.g., application ID, Git Stash repository, CI Pipeline job, Artifactory link, SonarQube Project ID, etc.) and initiate onboarding via button 902.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of generating compliance indicators on a user interface corresponding to a plurality of maturity levels of a continuous deployment system, the method comprising:

generating, by a server computing device, a first plurality of compliance indicators on for display on a user interface of a user device communicatively coupled to the server computing device, each of the first plurality of compliance indicators corresponding to one of a plurality of maturity levels of a continuous deployment system that relate to an in-progress deployment of a software application;

capturing, by the server computing device, compliance data corresponding to deployment status associated with the software application, the software application comprising newly-added source code and the compliance data captured using a plurality of individual collector modules each interfacing with a different data source;

determining, by the server computing device, whether one or more of the plurality of maturity levels of the continuous deployment system are completed for the software application based upon the captured compliance data, wherein each of the plurality of maturity levels of the continuous deployment system corresponds to one or more developer actions to be completed, including:

determining that a first level of the maturity levels is completed by receiving a pre-check indicator from an artifact repository associated with the software application and determining whether an artifact corresponding to the newly-added source code has been deployed to a managed environment, determining that a second level of the maturity levels is completed by determining whether at least one of a plurality of automated smoke tests have been completed on a latest deployed version of the software application, determining that a third level of the maturity levels is completed by determining whether at least one of a plurality of automated functional/regression tests have been completed on the latest deployed version of the software application, and determining that a fourth level of the maturity levels is completed by determining whether a dynamic security scan has been completed on the latest deployed version of the software application and determining whether a personally identifiable information (PII) data scan has been completed on the latest deployed version of the software application;

generating, by the server computing device, a second plurality of compliance indicators, each of the second plurality of compliance indicators corresponding to one of the plurality of maturity levels that is completed; and generating, by the server computing device, for display the generated second plurality of compliance indicators on the user interface of the user device, including replacing one or more of the first plurality of compliance indicators using the second plurality of compliance indicators, wherein the user interface comprises the first plurality of compliance indicators and the second compliance indicators arranged in sequence according to the maturity levels and each compliance indicator comprising a graphical status completion bar, the user interface providing a combined holistic/detailed view of the compliance status of the software application.

2. The computerized method of claim 1, wherein determining that a fifth level of the plurality of maturity levels is completed comprises:

determining, by the server computing device, whether chaos testing has been completed on the latest deployed version of the software application;

determining, by the server computing device, whether performance testing has been completed on the latest deployed version of the software application; and determining, by the server computing device, whether accessibility testing has been completed on the latest deployed version of the software application.

3. The method of claim 1, wherein the server computing device generates a third plurality of compliance indicators on for display on the user interface, each of the third plurality of compliance indicators corresponding to one of a plurality of maturity levels of a continuous integration system that relate to one or more development actions to be completed.

4. The method of claim 3, wherein the server computing device determines that a first level of the plurality of maturity levels of the continuous integration system is completed by:

determining whether a plurality of artifacts have been generated after one or more builds of the software application; and determining whether the plurality of artifacts have been transmitted to a repository.

5. The method of claim 4, wherein the server computing device determines that a second level of the plurality of maturity levels of the continuous integration system is completed by:

determining whether one of the one or more builds of the software application that includes the newly-added source code is triggered on a code commit; and calculating whether a unit test coverage corresponding to the newly-added source code is greater than or equal to 80%.

6. The method of claim 5, wherein the server computing device determines that a third level of the plurality of maturity levels of the continuous integration system is completed by:

calculating whether a unit test coverage corresponding to overall source code of the software application is greater than or equal to 50%; and determining whether a quality gate status has passed.

7. The method of claim 6, wherein the server computing device determines that a fourth level of the plurality of maturity levels of the continuous integration system is completed by:

whether the unit test coverage corresponding to the overall source code of the software application is greater than or equal to 70%; and determining whether a plurality of static security scans have been completed.

8. The method of claim 7, wherein the server computing device determines that a fifth level of the plurality of maturity levels of the continuous integration system is completed by:

calculating whether the unit test coverage corresponding to the overall source code of the software application is greater than or equal to 80%.

9. A system for generating compliance indicators on a user interface corresponding to a plurality of maturity levels of a continuous deployment system, the system comprising a server computing device communicatively coupled to a user device and a database over a network, the server computing device comprising a memory for storing computer-executable instructions and a processor that executes the computer-executable instructions to:

generate a first plurality of compliance indicators on for display on a user interface of a user device communicatively coupled to the server computing device, each of the first plurality of compliance indicators corresponding to one of a plurality of maturity levels of a continuous deployment system that relate to an in-progress deployment of a software application;

capture refreshed compliance data corresponding to deployment status associated with the software application, the software application comprising at least a portion of newly-added source code, and the compliance data captured using a plurality of individual collector modules each interfacing with a different data source, including:

identifying one or more of the newly-added source code for the software application that are assigned to a continuous deployment pipeline;

wherein each individual collector module:

deletes existing compliance data for the software application captured by the individual collector module, determines, for each newly-added source code assigned to a continuous deployment pipeline, whether the newly-added source code is enabled to refresh, and transfers, for each newly-added source code enabled to refresh, one or more newly-added source code values from the newly-added source code to a corresponding repository for the individual collector module;

determine whether one or more of the plurality of maturity levels of the continuous deployment system are completed for the software application based upon the captured compliance data, wherein each of the plurality of maturity levels of the continuous deployment system corresponds to one or more developer actions to be completed, including:

determining that a first level of the maturity levels is completed by receiving a pre-check indicator from an artifact repository associated with the software application and determining whether an artifact corresponding to the newly-added source code has been deployed to a managed environment, determining that a second level of the maturity levels is completed by determining whether at least one of a plurality of automated smoke tests have been completed on a latest deployed version of the software application, determining that a third level of the maturity levels is completed by determining whether at least one of a plurality of automated functional/regression tests have been completed on the latest deployed version of the software application, and determining that a fourth level of the maturity levels is completed by determining whether a dynamic security scan has been completed on the latest deployed version of the software application and determining whether a personally identifiable information (PII) data scan has been completed on the latest deployed version of the software application;

generate a second plurality of compliance indicators, each of the second plurality of compliance indicators corresponding to one of the plurality of maturity levels that is completed; and generate for display the generated second plurality of compliance indicators on the user interface of the user device, including replacing one or more of the first plurality of compliance indicators using the second plurality of compliance indicators, wherein the user interface comprises the first plurality of compliance indicators and the second compliance indicators arranged in sequence according to the maturity levels and each compliance indicator comprising a graphical status completion bar, the user interface providing a combined holistic/detailed view of the compliance status of the software application.

10. The system of claim 9, wherein the server computing device determines that a fifth level of the plurality of maturity levels is completed by:

determining whether chaos testing has been completed on the latest deployed version of the software application;

determining whether performance testing has been completed on the latest deployed version of the software application; and determining whether accessibility testing has been completed on the latest deployed version of the software application.

11. The system of claim 9, wherein the server computing device generates a third plurality of compliance indicators on for display on the user interface, each of the third plurality of compliance indicators corresponding to one of a plurality of maturity levels of a continuous integration system that relate to one or more development actions to be completed.

12. The system of claim 11, wherein the server computing device determines that a first level of the plurality of maturity levels of the continuous integration system is completed by:

determining whether a plurality of artifacts have been generated after one or more builds of the software application; and determining whether the plurality of artifacts have been transmitted to a repository.

13. The system of claim 12, wherein the server computing device determines that a second level of the plurality of maturity levels of the continuous integration system is completed by:

determining whether one of the one or more builds of the software application that includes the newly-added source code is triggered on a code commit; and calculating whether a unit test coverage corresponding to the newly-added source code is greater than or equal to 80%.

14. The system of claim 13, wherein the server computing device determines that a third level of the plurality of maturity levels of the continuous integration system is completed by:
   calculating whether a unit test coverage corresponding to overall source code of the software application is greater than or equal to 50%; and
   determining whether a quality gate status has passed.

15. The system of claim 14, wherein the server computing device determines that a fourth level of the plurality of maturity levels of the continuous integration system is completed by:
   whether the unit test coverage corresponding to the overall source code of the software application is greater than or equal to 70%; and
   determining whether a plurality of static security scans have been completed.

16. The system of claim 15, wherein the server computing device determines that a fifth level of the plurality of maturity levels of the continuous integration system is completed by:
   calculating whether the unit test coverage corresponding to the overall source code of the software application is greater than or equal to 80%.

* * * * *